US007730167B2

(12) United States Patent
Starbuck

(10) Patent No.: US 7,730,167 B2
(45) Date of Patent: Jun. 1, 2010

(54) METHODS AND SYSTEMS FOR HALTING SYNCHRONIZATION LOOPS IN A DISTRIBUTED SYSTEM

(75) Inventor: Bryan T. Starbuck, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1157 days.

(21) Appl. No.: 10/835,980

(22) Filed: Apr. 30, 2004

(65) Prior Publication Data

US 2005/0262310 A1 Nov. 24, 2005

(51) Int. Cl.
G06F 15/177 (2006.01)
(52) U.S. Cl. .................................. 709/221
(58) Field of Classification Search ......... 709/220–221, 709/206
See application file for complete search history.

(56) References Cited

U.S. PATENT DOCUMENTS

| | | | | |
|---|---|---|---|---|
| 5,684,990 | A * | 11/1997 | Boothby | 707/203 |
| 6,052,735 | A | 4/2000 | Ulrich et al. | 709/236 |
| 6,295,541 | B1 * | 9/2001 | Bodnar et al. | 707/203 |
| 6,324,544 | B1 | 11/2001 | Alam et al. | 707/201 |
| 6,442,570 | B1 | 8/2002 | Wu | 707/201 |
| 6,463,427 | B1 | 10/2002 | Wu | 707/3 |
| 6,470,329 | B1 * | 10/2002 | Livschitz | 707/1 |
| 6,505,214 | B1 | 1/2003 | Sherman et al. | 707/201 |
| 6,879,996 | B1 * | 4/2005 | Laves | 709/206 |
| 6,925,467 | B2 * | 8/2005 | Gu et al. | 707/101 |
| 2003/0005342 | A1 | 1/2003 | Thomas et al. | 713/400 |
| 2003/0046434 | A1 | 3/2003 | Flanagin et al. | 709/248 |
| 2003/0055825 | A1 | 3/2003 | Chen et al. | 707/10 |
| 2003/0073411 | A1 * | 4/2003 | Meade, II | 455/70 |
| 2004/0204085 | A1 * | 10/2004 | Vargas et al. | 455/557 |

OTHER PUBLICATIONS

ATIS Committee T1A1, "Hamming Weight," Feb. 28, 2001, ATIS, <http://www.atis.org/tg2k/_hamming_weight.html>.*
Ming Xiong, et al., "Mirror: A State-Conscious Concurrency Control Protocol for Replicated Real-Time Databases," Information Systems, vol. 27, Issue 4, Jun. 2002, pp. 277-297.
Bhalla, S., "The Performance of an Efficient Distributed Synchroization and Recovery Algorithm," Journal of Supercomputing, vol. 19, Issue 2, Jun. 2001, pp. 199-219.
Son, S.H., et al., "A Token-Based Synchronization Scheme for Distributed Real-Time Databases," Information Systems, vol. 18, Issue 6, Sep. 1993, pp. 375-389.
Sinha, M.K., "Commutable Transactions and the Time-Pad Synchronization Mechanism for Distributed Systems," IEEE Transactions on Software Engineering, vol. SE-12, Issue 3, Mar. 1986, pp. 462-476.

* cited by examiner

Primary Examiner—Benjamin R Bruckart
Assistant Examiner—Farhad Ali

(57) ABSTRACT

The present provides for consistent resolution of data conflicts when synchronizing data between two or more devices in order to reduce the likelihood of an infinite synchronization loop within a distributed computing system. More particularly, example embodiments provide for a conflict resolution algorithm capable of generating unique values for properties that are in conflict. Data selection criteria can then be used to determine which of the properties should be used to resolve the conflict. Such data selection criterion increases the likelihood of providing consistent resolution of similar data conflicts between other devices in the distributed system.

25 Claims, 14 Drawing Sheets

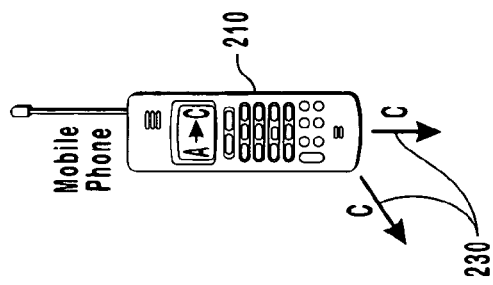
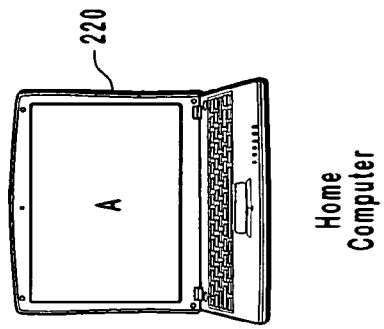
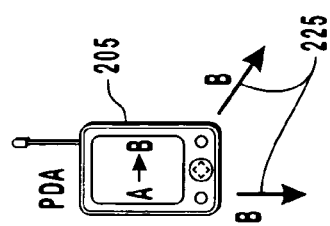
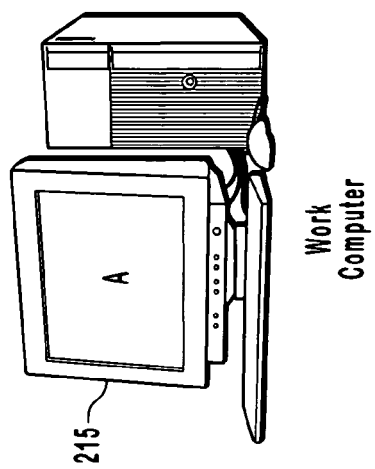
Fig. 2A

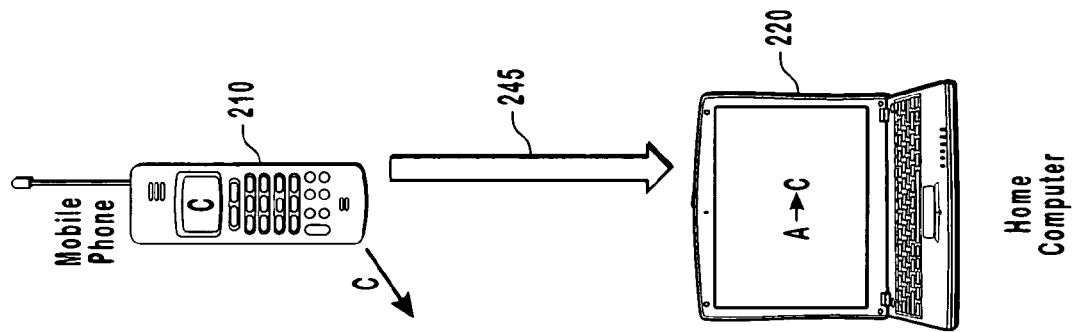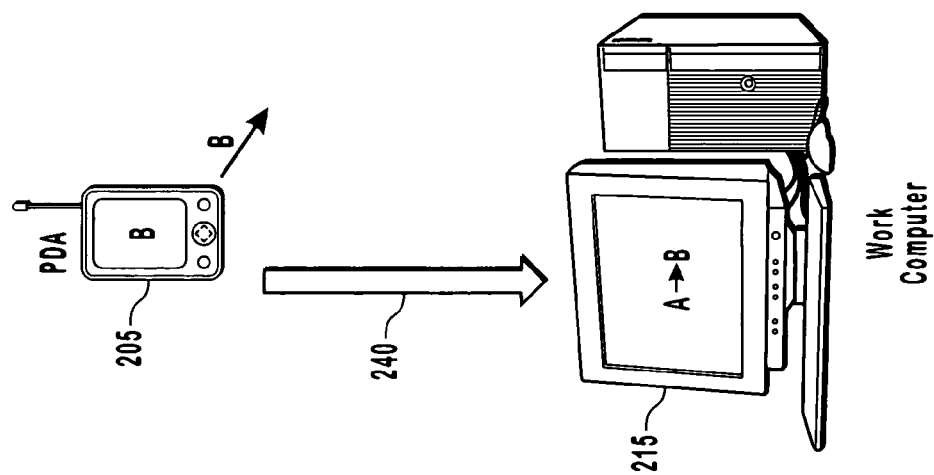
Fig. 2B

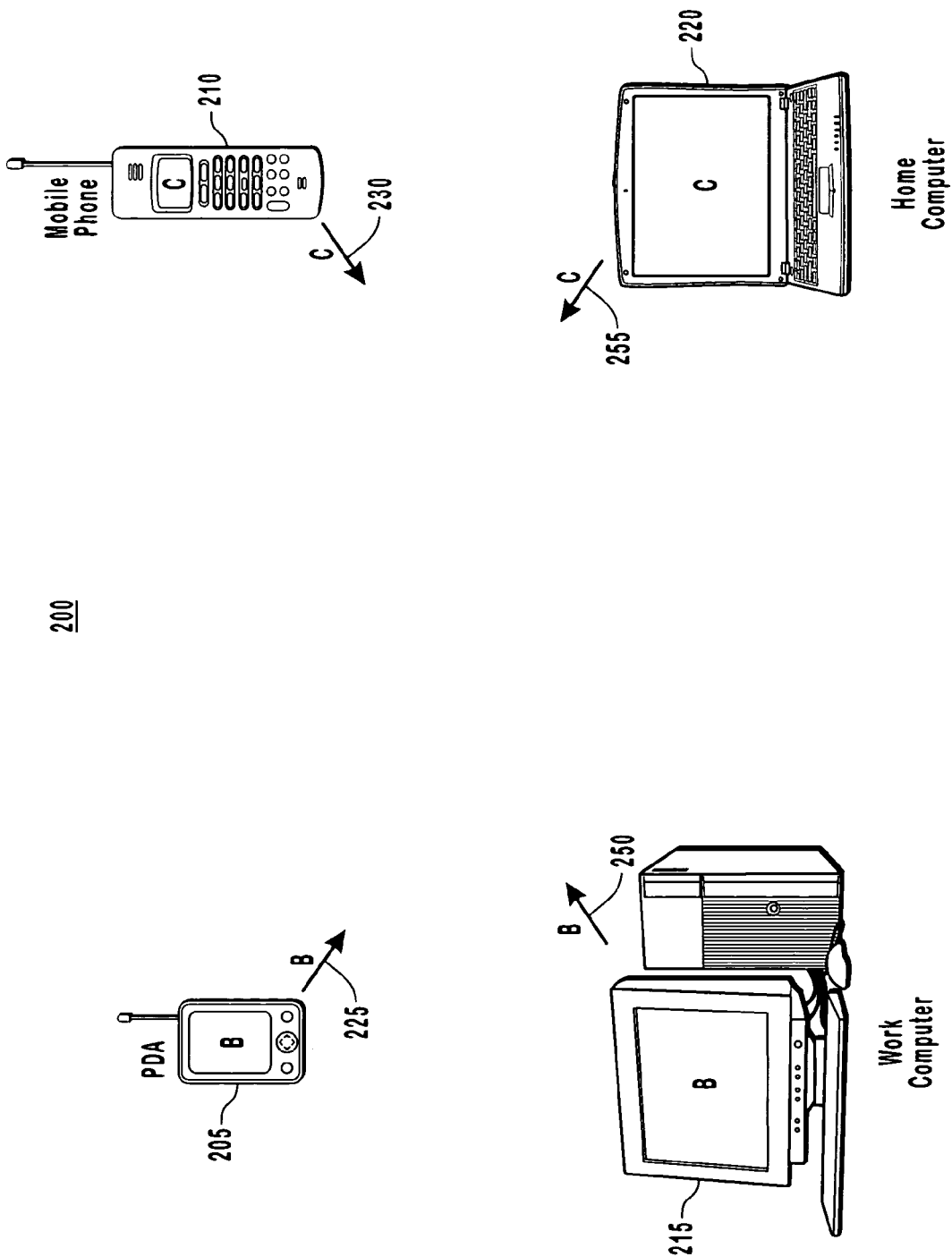

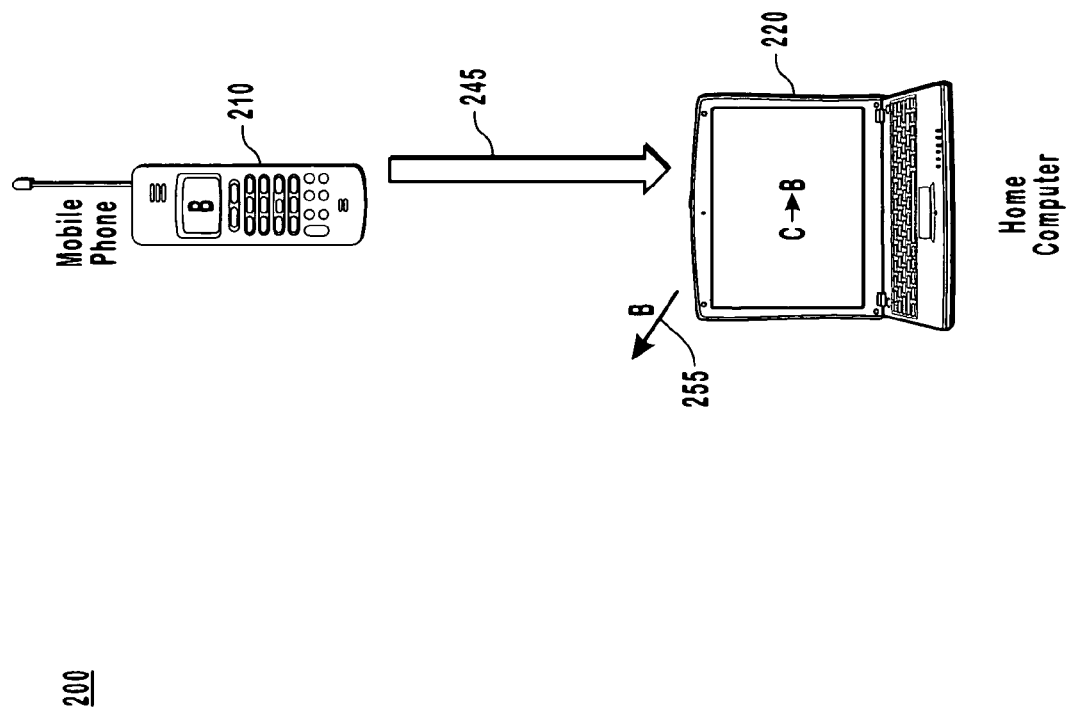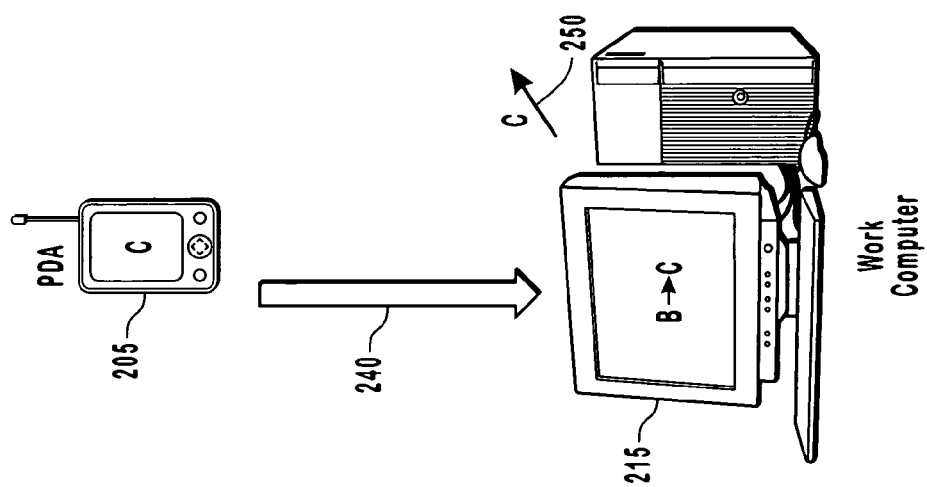
Fig. 2F

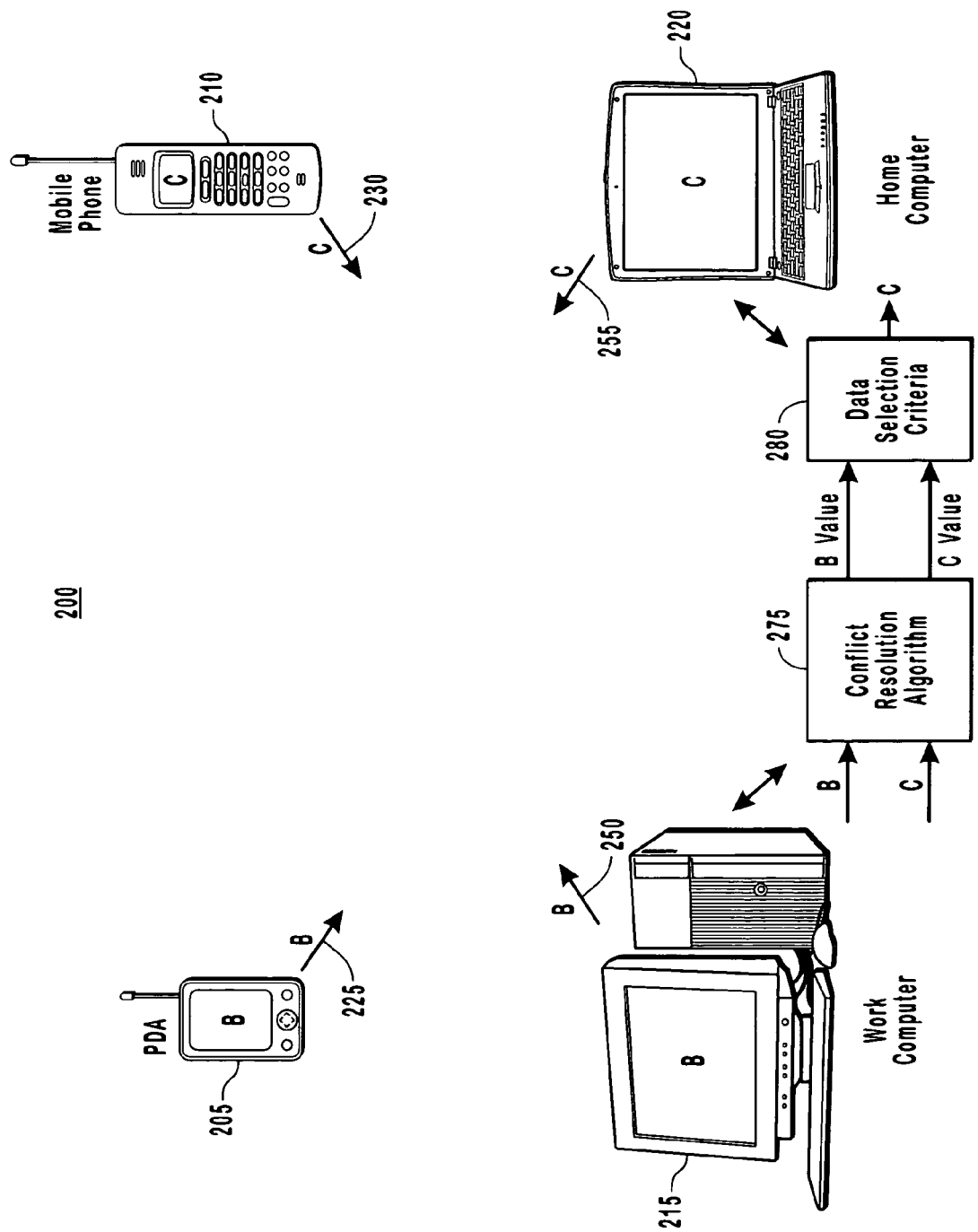

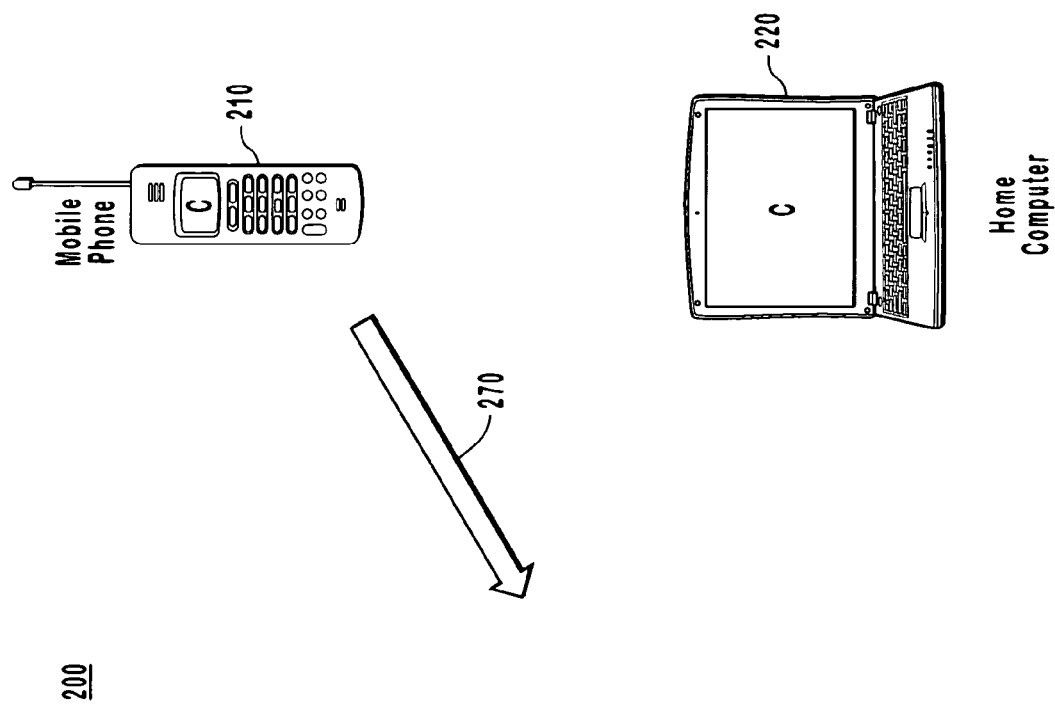
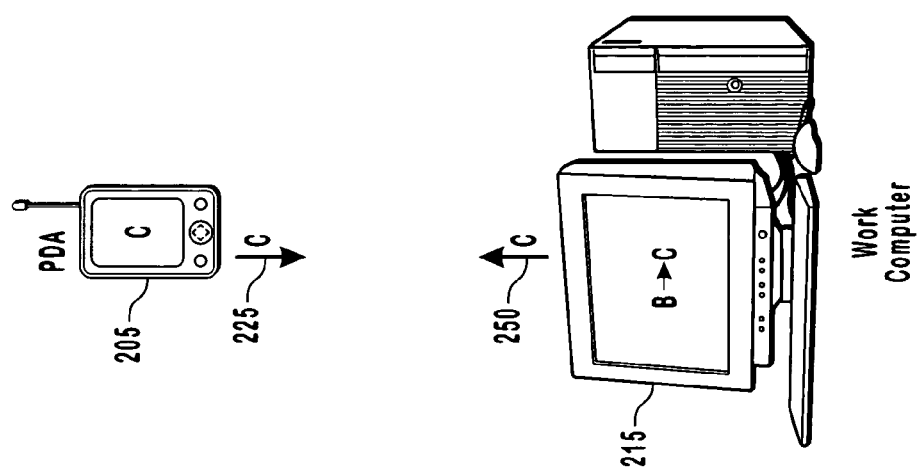
Fig. 21

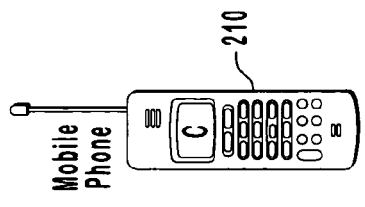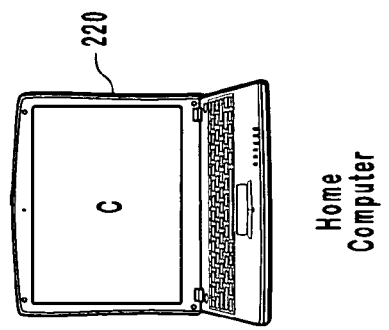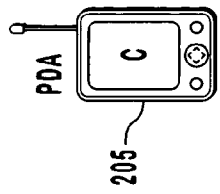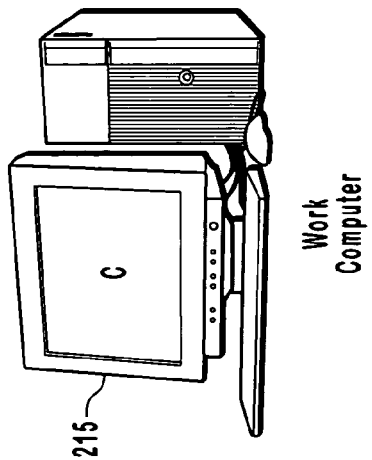
Fig. 2J

METHODS AND SYSTEMS FOR HALTING SYNCHRONIZATION LOOPS IN A DISTRIBUTED SYSTEM

CROSS-REFERENCE TO RELATED APPLICATIONS

N/A

BACKGROUND OF THE INVENTION

1. The Field of the Invention

The present invention generally relates to synchronizing data within a distributed computer system. More particularly, the present invention provides for consistent resolution of data conflicts when synchronizing data between two or more devices in order to reduce the likelihood of an infinite synchronization loop.

2. Background and Related Art

Laptop, handheld, and other portable computers or computing devices have increased in popularity as the devices become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on Read-Only Memory (ROM)). Alternatively, one or more application programs may be installed by the user after purchasing the portable computer.

With the increased popularity and computing power of such devices, people are beginning to store data and applications using more than just a single computing device. Many people, for example, often use laptop computers in addition to their regular desktop computer. Other devices such as cellular telephones, Personal Digital Assistance (PDAs), Internet services, and the like are also used for storing data and applications.

Each of these computing devices may be part of a distributed computing system wherein related information can be correlated and stored on multiple such devices. For example, a user may have a digital address book stored on their desktop work computer, on their PDA, on their cell phone, on an Internet service, etc. Accordingly, while at work, it may be convenient for the user to access contact information, which may include phone numbers and other general contact information. While away from work, however, the user may be able to use the address book in a mobile form such as a personal digital assistance (PDA) or other mobile information storage system. Ideally, the contact information of the PDA should match the contact information at the desktop work computer.

When the same or related information is stored in two places, it is possible for the data to change in one location and not in the other. This problem may be overcome through synchronization, which is an automated process that attempts to ensure that each device within the distributed system has the most current information or data. Synchronization, however, has its own set of problems. For example, when synchronization is initialized between the two devices, current systems detect changed property values by comparing corresponding property values from each device. Such comparison, however, gives no indication as to which device made the change. As such, when a property change has occurred on either device, a conflict occurs and a conflict resolution process must be performed.

Other systems mark a changed property with a tag indicating that a change has occurred, e.g., "change," "delete," "add," or other tag, as appropriate. In such systems, however, when two devices start syncing, one of the devices can create these markers in memory after comparing the data for what needs to be applied. In other words, conflicts must first be reconciled and then the properties can be marked.

Typically, conflicts can be resolved through comparing metadata associated with the property values that give, e.g., time date information. The latest time date information may be considered the most up-to-date information and the properties can be updated accordingly. Many smaller computing devices, however, have limited physical resources and are incapable of maintaining time date information for properties of a data structure item. Further, in a distributing computing network there is typically no single server with a "master" copy of data that can be used to resolve discrepancies or conflicts. Accordingly, in such situations, typically a User Interface (UI) is presented to a user notifying them of the conflict and directing them to choose what value to use to resolve the conflict. This process can become, however, tedious in the event of numerous conflicts and can degrade the user experience.

Some systems have attempted to overcome the above problem by presenting a default value to the user or to resolve the conflict automatically. In either event, the choice is typically based on arbitrary techniques and considerations such as network topology. For example, some systems choose a default value or resolve the conflict through rules that choose the values based on a particular nodes status (e.g., location) within the network. For instance, one rule for resolving conflicts may mandate that if a conflict exits, all servers values should win, or if the choose is between a high fidelity and low fidelity device, then all high fidelity device values should be chosen. Of course, there are a number of network topology choices or other similar choices available.

Although selecting a value based on network topology resolves the conflict, this can also result in values being essentially continuously transferred between nodes in the distributed computing system, which is termed an infinite loop. In such situations, the user can be continually presented with choices of opposing default values to resolve the conflict and/or the data is continually updated on the devices and the user will have to provide some type of intervention in order to stop the changing of the data. Further, continuously transferring data between nodes in a distributed system unnecessarily consumes network bandwidth, preventing other modules from utilizing the network bandwidth. As such, it is desirable to be able to break infinite loops in a distributed network system in order to ensure a good user experience and preserve valuable processing resources.

BRIEF SUMMARY OF THE INVENTION

The above-identified deficiencies and drawbacks of current synchronization system are overcome by the present invention. For example, in a distributed computing system capable of synchronizing properties, the present invention provides for consistent resolution of data conflicts when synchronizing data between two or more devices in order to reduce the likelihood of a potentially infinite synchronization loop within the distributed system.

Example embodiments provide for receiving remote device data that includes a remote property needing to be synchronized with a local property. Further, local machine data that includes the local property needing to be synchronized with the remote property is accessed, whereupon it is determined that a conflict exists between the remote property and the local property. A conflict resolution algorithm generates a unique remote value from the property value and also generates a unique local value from the local property value. Based on data selection criteria, it is determined that either the local property or the remote property is to be used for synchronization. This data selection criteria increases the likelihood of providing consistent resolution of similar data conflicts at other devices in the distributed computing system.

Other example embodiments provide that the conflict resolution algorithm is transitive in that unique values can be generated for a large number of properties. For example, the conflict resolution algorithm may be a hash function and the data selection criteria may be a choice of the greatest or least value between the remote value and the local value. Alternatively, the conflict resolution algorithm may chose a portion of the remote property in a corresponding portion of the local property, and the remote and local values could be based on the number of positive or negative bits. In such case, the data selection criteria may be a choice of the greatest or least number of positive bits between the remote value and the local value. Another conflict algorithm used in accordance with example embodiments includes the use of a pattern (e.g., left-to-right, right-to-left, or other) to walk through a binary representation of the remote property and corresponding local property bits or a digest thereof. In this instance, the data selection criteria can declare a winner based on the first time a bit (or set of bits) doesn't match between the remote property and local property. The pattern used on each set of data does not necessarily need to be symmetric. Of course, other similar algorithms and selection criteria can be used in order to uniquely select data for reducing the likelihood of potentially infinite synchronization loop within the distributed system.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A-F illustrate the problems associated with network topology considerations for choosing a default value for resolving a conflict;

FIGS. 2G-J illustrate how conflict resolution algorithm and data selection criteria can be used to dampen a infinite loop in accordance with example embodiments of the present invention;

DETAILED DESCRIPTION OF THE PREFERRED EMBODIMENTS

The present invention extends to methods, systems and computer program products for consistent resolution of data conflicts when synchronizing data between devices in a distributed computing system in order to reduce the likelihood of a potentially infinite synchronization loop. The embodiments of the present invention may comprise a special purpose or general-purpose computer including various computer hardware, as discussed in greater detail below.

A heterogeneous peer to peer network or a distributed computing system is a network that has different software running on different nodes of the network. Being a distributing computing system or peer to peer network means that there is no single server with a "master" copy of data that can be used to resolve discrepancies-or conflicts. Such a network topology of computers can cause synchronization loops if synchronization is done incorrectly. Depending on how conflicts are resolved, synchronizing loops can be essentially infinite loops. Devising a system to prevent synchronization loops across heterogeneous systems can be a difficult problem to solve because each system is guaranteed to act differently in at least a small way.

The present invention overcomes the above-identified difficulties by providing consistent resolution of data conflicts when synchronizing data between two or more devices in order to reduce the likelihood of a potentially infinite synchronization loop within a distributed computing system. More particularly, example embodiments provide for a conflict resolution algorithm capable of generating unique values for properties that are in conflict. Data selection criteria can then be used to determine which of the properties should be selected to resolve the conflict. Such data selection criterion increases the likelihood of providing consistent resolution of similar data conflicts at other devices in the distributed system. This technique works even though other nodes within the heterogeneous network are resolving conflicts or choosing default values based on methods. In other words, the dampening affect of the present invention will assist other nodes not using the exemplary technique to still converge to a single value.

Reference will now be made to figures wherein like structures will be provided with like or similar reference designations. It should be understood that the drawings are examples of schematic representations of embodiments of the invention, and are not meant to limit or otherwise narrow the scope of the present invention.

Figure 1A:
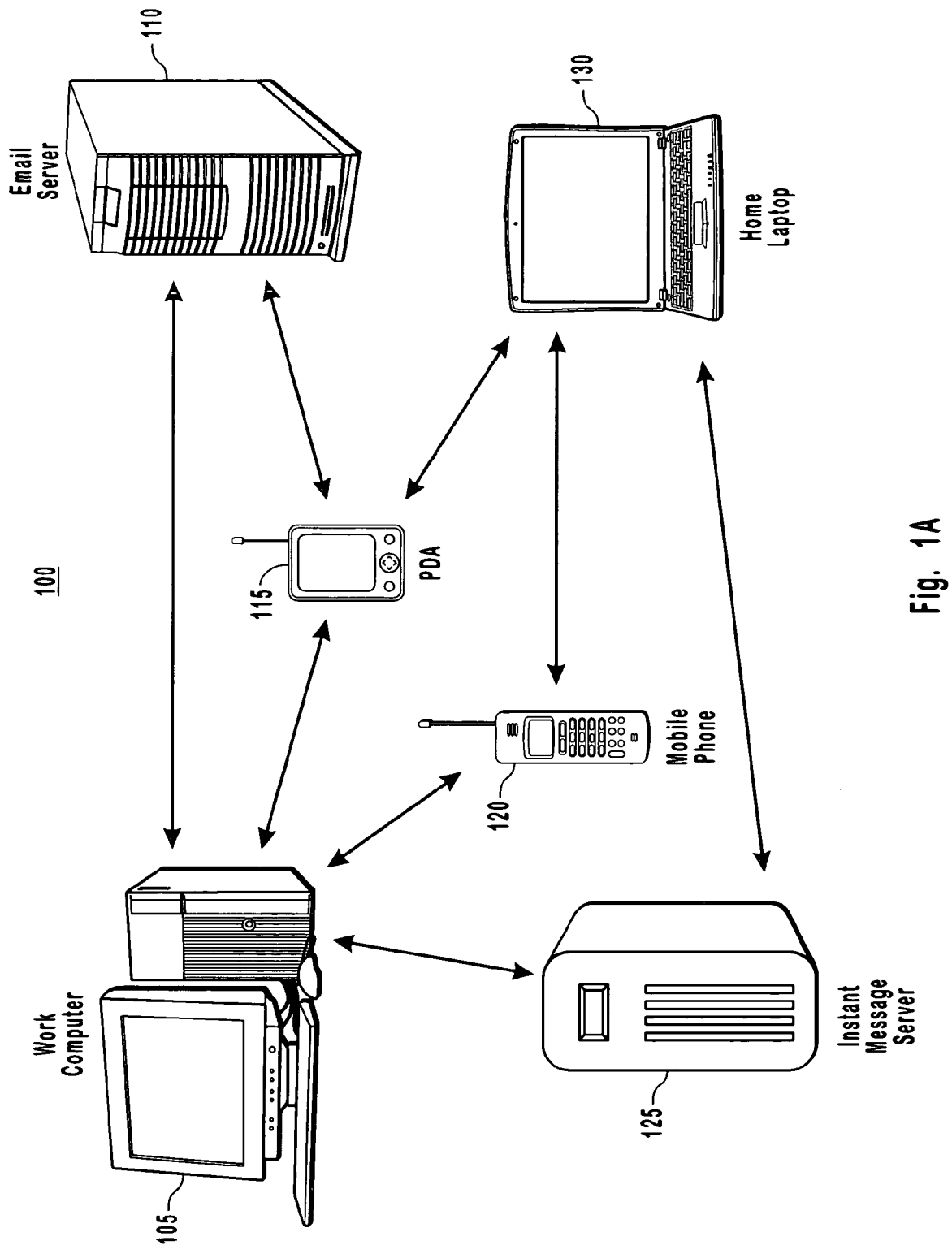
FIG. 1A illustrates a distributed system with high fidelity and low fidelity devices in which the present invention may be implemented.

FIG. 1A illustrates several nodes within a distributed computing network 100 to illustrate the connections and how each node syncs with other nodes within the system. For example, as shown in the distributed computing system 100 work computer 105 can sync with several various devices such as email server 110, PDA 115, mobile phone 120, and instant message server 125. The purpose for synchronizing data within such a distributed computing system 100 is to ensure that the most up-to-date information is provided on all devices used by one or more users.

Data needing to be synchronized may be, e.g., contact information wherein each item would correspond to information about an individual person, company, corporation, or any other similar contact. An example of the properties associated with each contact item may be first name, middle name, last name, company name, address, phone number, email address, website information, etc. As one would recognize, however, the local data may be information other than contact information. For example, the local data could be a calendar and/or scheduling information, a file, an application or any other such information needing to be synced between two devices. Accordingly, reference to contact information is used for illustrative purposes only and is not meant to limit or otherwise narrow the scope of the present invention except where explicitly claimed.

Similar to work computer 105, home laptop 130 may be able to be synced between instant message server 125, mobile phone 120, PDA 115, and email server 110. The distributed computing system 100 may be made up of low fidelity (e.g., a device whose database is not capable of storing time date information for properties) and high fidelity devices. This is important to consider since ideally every database would have time date information for each property in an item to indicate the last time the user modified the property. If that was the case, then the sync adapters could use a "last-writer-wins" rule to let the last time date information pick the winner. This would solve some looping problems and result in the best property winning each conflict (provided the clocks used within the distributed computing system 100 are synchronized as well). Because many distributed computing systems 100 are made up of at least some legacy clients with limited memory resources for storing such time date information, and because it is desirable to support such legacy clients, there needs to be other ways to resolve conflicts between devices while avoiding potentially infinite sync loops. This is particularly true in the case of low fidelity devices that are not capable of storing time date information.

Figure 1B:
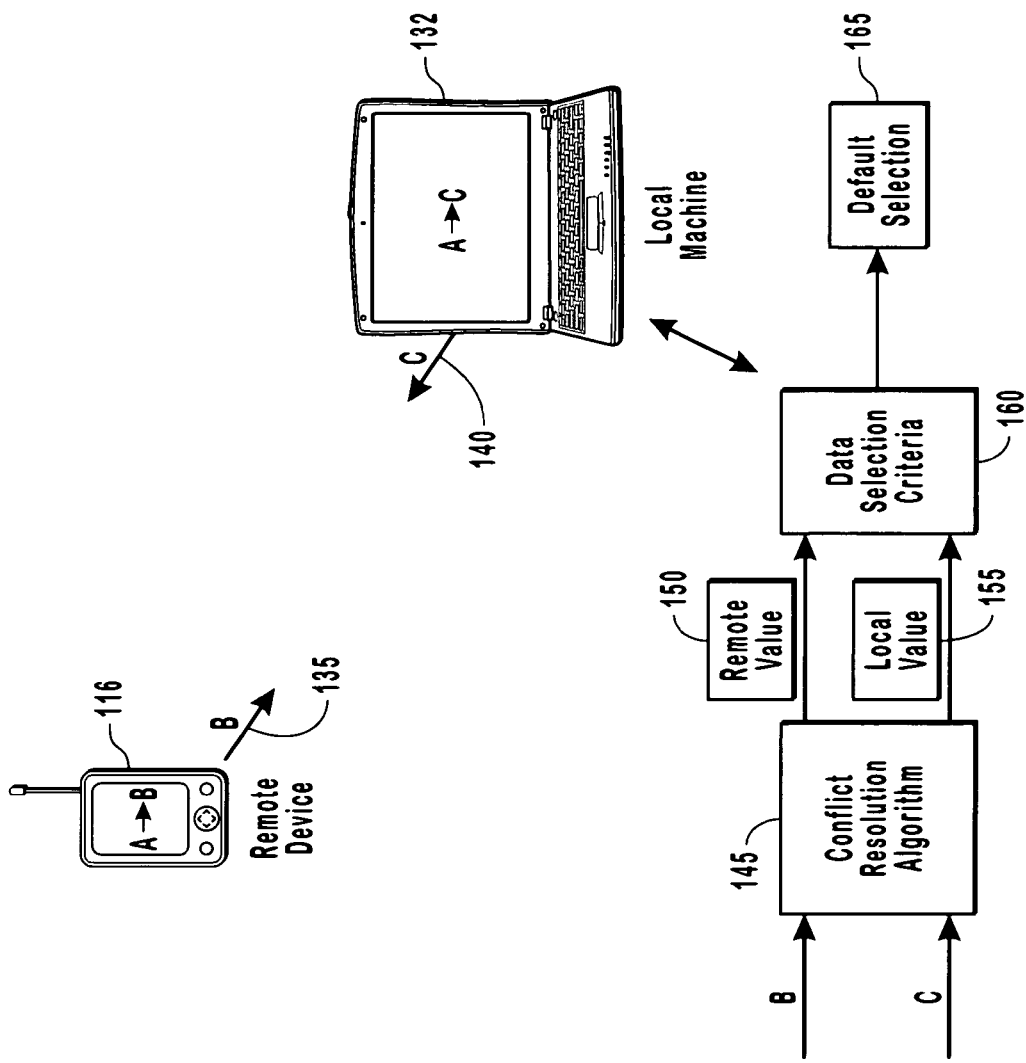
FIG. 1B illustrates the selection of a default value when a conflict exists between two devices within the distributed system in accordance with example embodiments of the present invention.

FIG. 1B illustrates a portion of the distributed computing network 100 with remote devices 116 (such as mobile phone 120 or PDA 115) and a local machine 132 (such as home laptop 130 or work computer 105). As shown, remote device 116 changed a property value from A to B at some point after the last synchronization between remote device 116 and local machine 132. Similarly, local machine 132 changed the same property value from A to C subsequent to the last synchronization between the two devices 116, 132. As such, remote device 116 has a needs sync arrow 135 showing that the value of B for the property should be synced down to local machine 132. Similarly, local machine 132 has a needs sync up arrow 140 indicating that the value of C should be synced up to remote device 116. Because both devices 116, 132 have sync arrows to sync property values down and up, respectively, a conflict can result.

Exemplary embodiments of the present invention provides for conflict resolution algorithm 145 for generating unique values for input properties. For instance, as shown in FIG. 1B, the property value B from remote device 116 needing to be synced down 135 to local machine 132 can be imputed into conflict resolution algorithm 145 to generate a remote value 150. Similarly, the property value C needing to be synced up 140 to remote device 116 from local machine 132 can also be input into conflict resolution algorithm 145 to generate a local value 155. Each of these values will be unique based on the functionality of conflict resolution algorithm 145. In addition, conflict resolution algorithm 145 should produce results that are transitive in that if a relation holds between a first property and a second and between the second property and a third, it holds between the first and third property. For instance, if A is greater than B, and B is greater than C, in order for the result to be transitive then A must be greater than C.

Example embodiments provide that conflict resolution algorithm 145 may be a hash function such as MD5, SHA-1, or the like. Using a hash to produce remote value 150 and local value 155 produces unique values for each different property imputed, which are also transitive in nature.

Data selection criteria 160 may then be used to compare the remote value 150 and local value 155 in order to make a selection of either value based on some predetermined criteria. For example, in the case of a hash function the data selection criteria 160 may be to choose the largest or smallest value generated through the conflict resolution algorithm 145. As is shown in FIG. 1B, this selection may then be used as a default selection 165 which could be presented to the user in a UI (not shown) that highlights the default value. Another alternative may be that the UI allows the user to select an "all defaults option," wherein the user can simply indicate their desire to choose all default values. Alternatively, the default selection 165 may be an automatic choice in order to enhance the user experience by not presenting an overly burdensome number of options to the user.

Of course, the present invention is not limited to just hash functions to produce unique results, nor is the data selection limited to the selection of a largest or smallest value. Any algorithmic manipulation capable of producing unique results can be used for the conflict resolution algorithm 145 and any logical selection criteria of such unique values can be used for data selection criteria 160. For example, conflict resolution algorithm 145 may be a comparison of the binary streamed data looking at the value of each bit or a set of bits (e.g., a byte of data). In such case, the data selection criteria 160 may be to choose the property value based on a first positive bit (e.g., "1") in the data stream that does not conflict with a bit from the comparing data value. For example, remote value 150 and local value 155 may be a stream of bits of 000101 and 000100, respectively. In this instance, remote value 150 would be selected by data selection criteria 160 since it has the first positive bit without a conflict (i.e., the last bit in the stream of bits for remote value 150 is a positive 1 value, whereas the last bit value for local value 155 is a zero).

Another similar conflict resolution process may be achieved by again having conflict resolution algorithm 145 compare binary values for remote value 150 and local value 155. In this comparison, however, conflict resolution algorithm 145 may add all the positive bits for at least a portion of remote value 150 and at least a portion of local value 155. Data selection criteria, may then choose the greater or lesser of remote value 150 and local value 155 produced, and the resulting choice may be used as the default selection for 165.

Another type of conflict resolution algorithm 145 and data selection criteria 160 process uses a pattern (e.g., left-to-right, right-to-left, or other) to walk through a binary representation of the remote property and corresponding local property bits or a digest thereof. In this instance, the data selection criteria can declare a winner based on the first time a bit (or set of bits) doesn't match between the remote property and local property. The pattern used on each set of data does not necessarily need to be symmetric.

Of course, as previously mentioned, any other number of well known algorithms and logical selection of data based on the results of such algorithms can be used for conflict resolution algorithm 145 and data selection criteria 160. Accordingly, reference to conflict resolution algorithm 145 and data selection criteria 160 should be broadly construed to encompass any such algorithm or manipulation of data that produces unique resulting values and any such logical selection of data based on the results. Further, the above use of a hash and other conflict resolution algorithms, as well as the choice of the largest or smallest value produced from the conflict resolution algorithm 145, are used for illustrative purposes only and are not meant to limit or otherwise narrow the scope of the present invention, except where explicitly claimed.

Figure 2D:
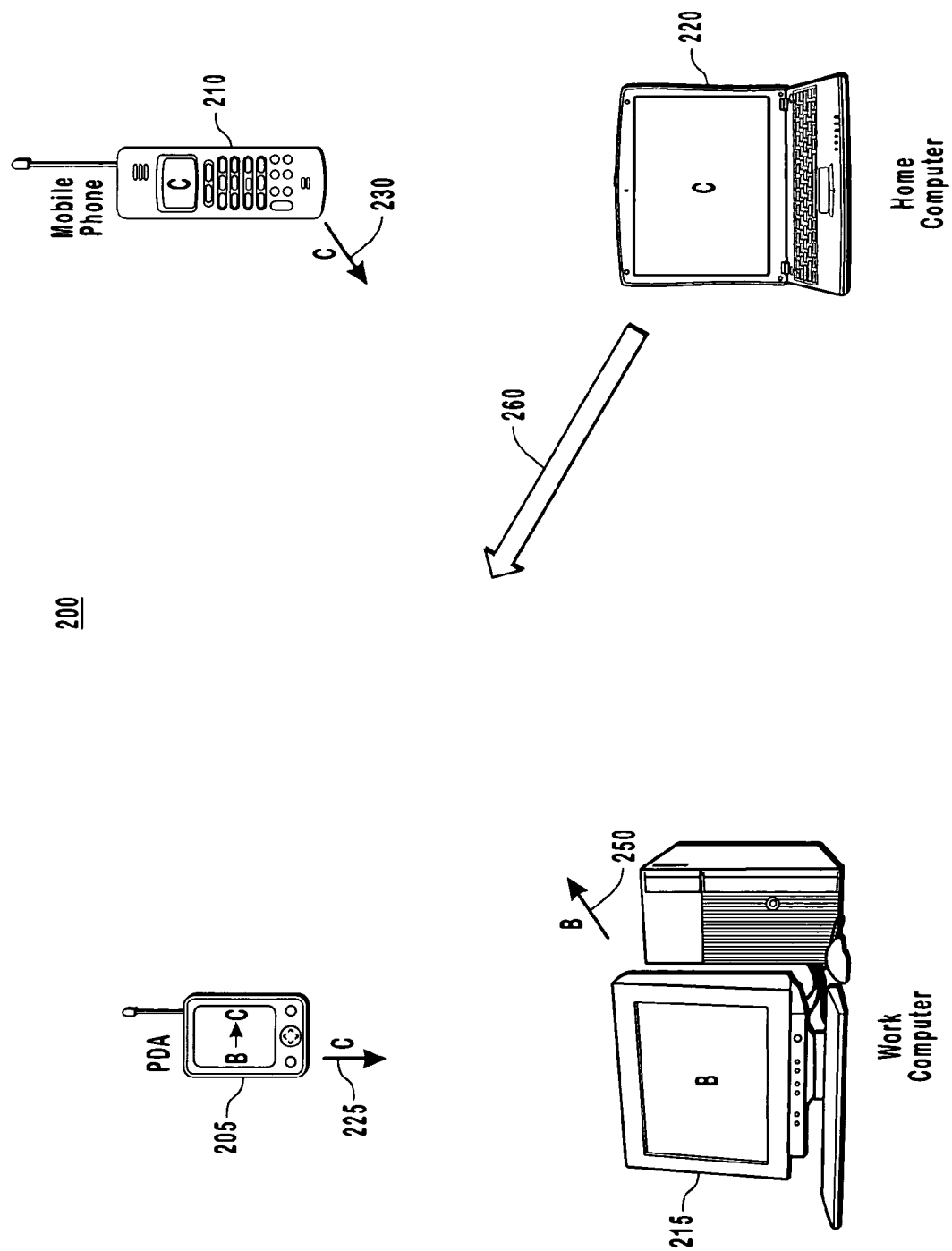
Figure 2E:
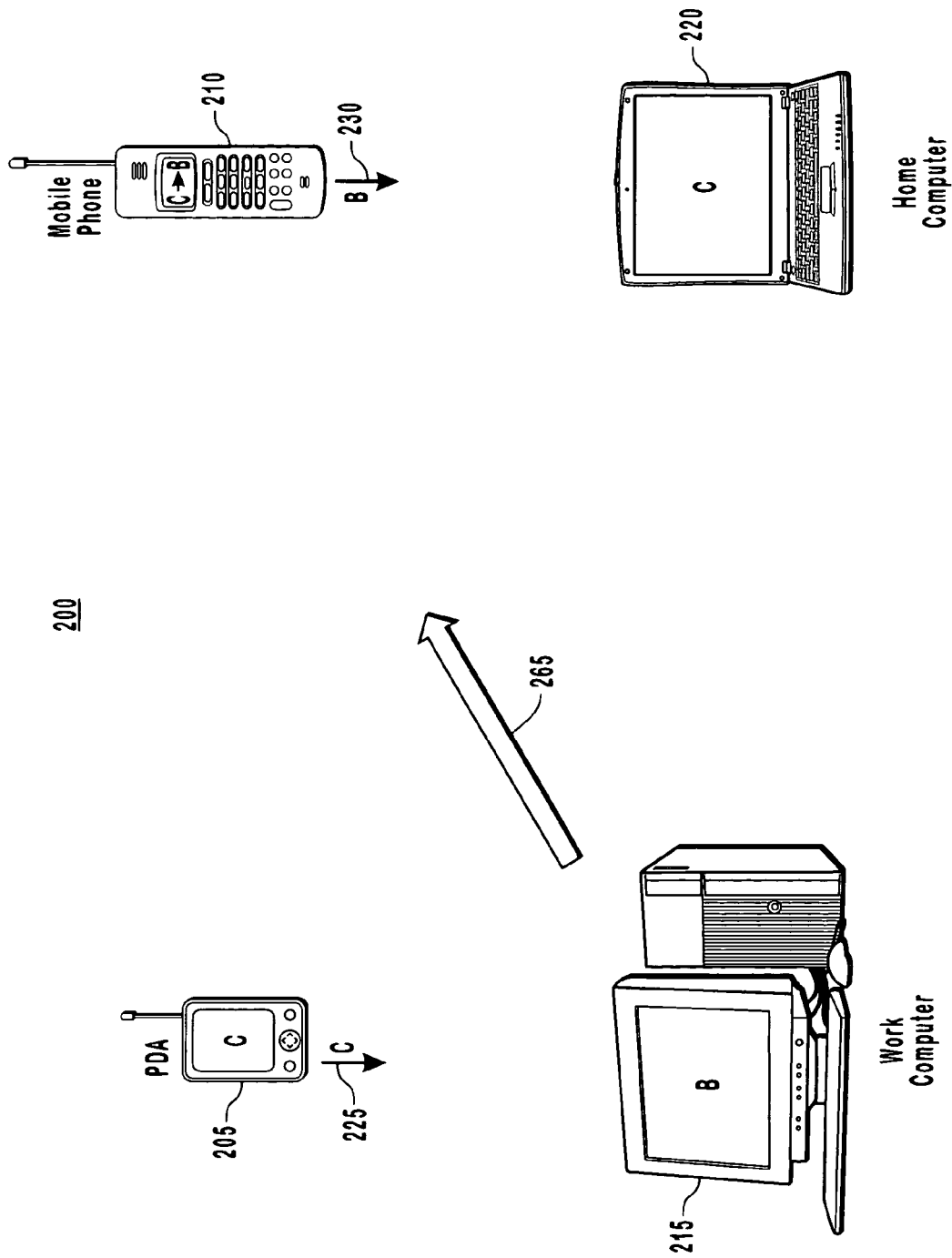

As previously mentioned, a network topology of computers can have potentially infinite sync loop if synchronization or choices of default values are inappropriately assigned. For example, FIGS. 2A-F illustrate infinite loop when the default value is based on a choice of network topology. In FIG. 2A, distributed system 200 has two low fidelity devices, PDA 205, and mobile phone 210, and two high fidelity nodes, work computer 215, and home computer 220. By way of illustration, the default value choice is based on selection criteria that if a conflict exists between a high fidelity device and a low fidelity device, the high fidelity node value always wins.

As shown in FIG. 2A, PDA device 205 has changed a property value from A to B and mobile phone 210 has also changed the corresponding property value from A to C. As such, sync down arrows 225 and 230 indicate the need for each device 205, 210 to sync the changed data to corresponding work computer 215 and home computer 220. As shown in FIG. 2B, because no conflict currently exists between PDA 205 and work computer 215, the B value may be synced down 240 to work computer 215 upon initialization of the synchronization process. As such, work computer 215 changes the corresponding property value from A to B. Similarly, no conflict exists between mobile phone 210 and home computer 220. As such, the C value may be synced down 245 and home computer 220 will change the property value from A to C.

As shown in FIG. 2C, the above syncing down 240 of property value B between PDA 205 and work computer 215 results in sync up arrow 250 indicating that property value of B needs to be synced up to mobile phone 210. Similarly, the syncing down 245 of property C value from mobile phone 210 to home computer 220 results in sync up arrow 255 indicating a need for the property value C to be synced up to PDA 205. Because property value B needs to sync down 225 to home computer 220, and property value C needs to sync up 255 to PDA 205, a conflicts now exist between PDA 205 and home computer 220. Similarly, property value C needs to sync down 230 from mobile phone 210 to work computer 215, and a property value of B needs to sync up to 250 mobile phone 210, thereby also resulting in a conflict between mobile phone 210 and work computer 215.

FIG. 2D illustrates the conflict resolution between PDA 250 and home computer 220. In this topology because the high fidelity node, i.e., home computer 220, always wins in a conflict with a low fidelity device, i.e. PDA 205, the C value is synced up 260 to PDA 205. Accordingly, PDA 205 changes property value from B to C, thereby producing sync down arrow 225 indicating a need sync the property value C down to the work computer 215. Similarly, in FIG. 2E, the conflict between work computer 215 and mobile phone 210 is resolved in favor of the high fidelity work computer 215, thereby syncing 265 the B value up to the mobile phone 210. Mobile phone 210 will then change the property value from C to B, thereby resulting in sync down arrow 230 indicating the need to sync the B value down to home computer 220.

In FIG. 2F, because no conflict exits between PDA 205 and work computer 215 (i.e., there are no competing sync up and sync down arrows between the nodes), upon the next synchronization between PDA 205 and work computer 215, the C property value will be synced down 240 to work computer 215. As such, work computer 215 will change the property value from B to C, thereby resulting in sync up arrow 250 indicating that the property value of C needs to be synced up to mobile phone 210 on the next sync. Similarly, because no conflict resides between mobile phone 210 and home computer 220, upon the next sync between these two nodes 210, 220 the B value will be synced 245 from mobile phone 210 to home computer 220, which also results in sync up arrow 255 indicating that the B property value needs to be synced up to PDA 205 on the next sync. Because no conflicts exist between home computer 220 and PDA 205, and because no conflicts exist between work computer 215 and mobile phone 210, the values on the low fidelity devices 205, 210 will be changed accordingly. This process will now continue because no conflicts exist, thereby resulting in a sync loop that, if not broken through user intervention, can potentially continue indefinitely.

Figure 2H:
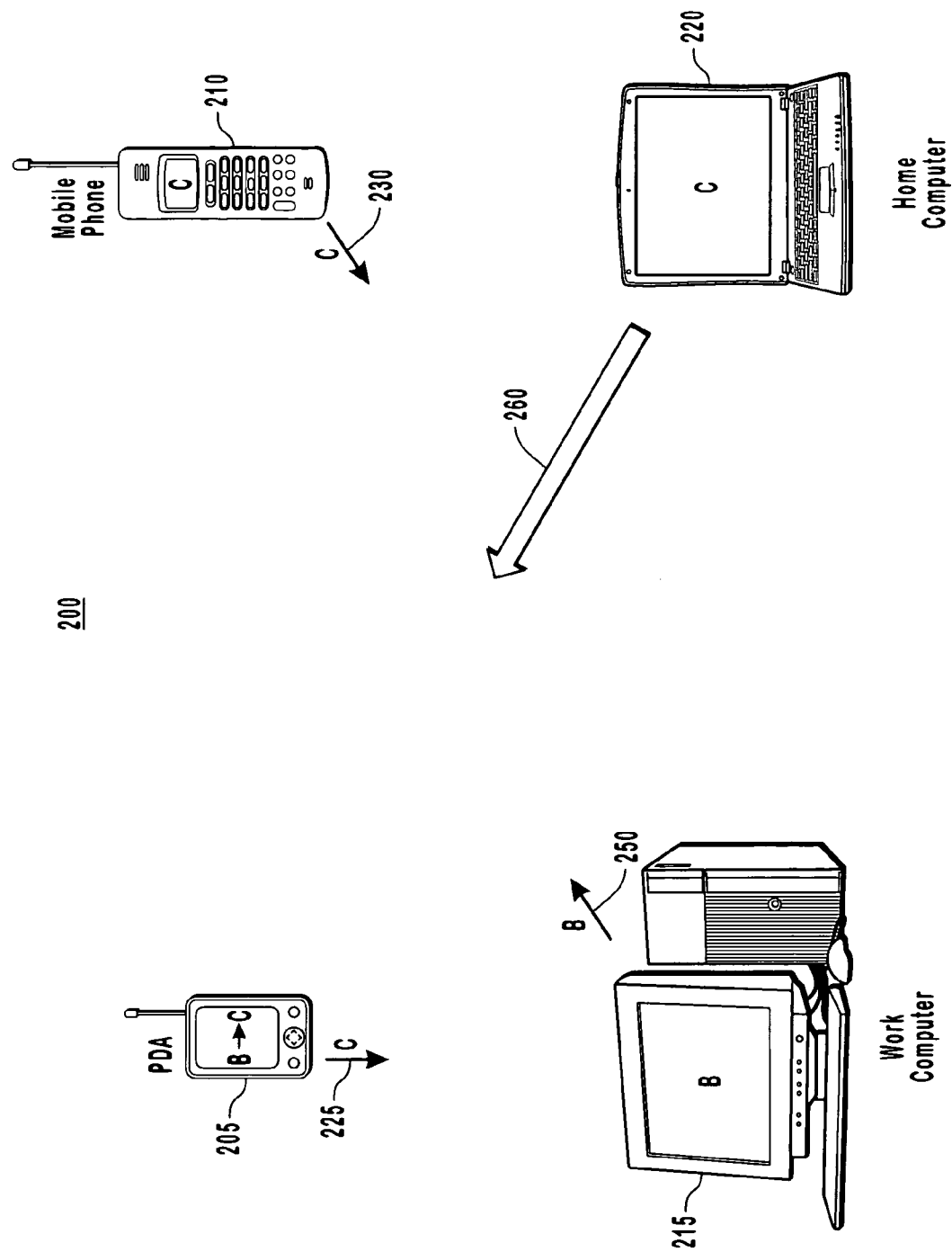

FIGS. 2G-I illustrate an example of how the present invention uses conflict resolution algorithm 145 and data selection criteria 160 to increase the likelihood of providing consistent resolution of data conflicts between devices. As shown in FIG. 2G, a conflict exists between PDA 205 and home computer 220, and a conflict exists between work computer 215 and mobile phone 210. In order to resolve these conflicts, the present invention provides for conflict resolution algorithm 275, which (similar to conflict resolution algorithm 145) can generate unique values for both property values B and C. Data selection criteria 280 can then be used to choose among these two values for both work computer 215 and home computer 220.

Example embodiments provide that work computer 215 and home computer 220 both use the conflict resolution algorithm 275 and data selection criteria 280 to resolve conflicts between competing property values. Accordingly, because the conflict resolution algorithm 275 produces unique values for a set of given inputs, and because data selection criteria 280 chooses a consistent result between the produced unique values, the selected property value will be the same for both work computer 215 and home computer 220. For example, as shown in FIG. 2G, conflict resolution algorithm 275 is given the property values of B and C as input values. Conflict resolution algorithm 275 then produces unique B and C values based on the input values in accordance with those any one of a number of techniques previously described. Data selection criteria 280 then uses an applied logic to choose one of the values from the resulting values produced at conflict resolution algorithm 275. In this example, data selection criteria 280 choose C to be the default value to be implemented on both work computer 215 and home computer 220.

As shown in FIG. 2H, home computer 220 now syncs 260 the C property value to PDA 205, which changes the property value from B to C on PDA 205. This also results in producing sync down arrow 225 indicating the need for the C property value to be synced down to work computer 215 on the next sync. Similarly, as shown in FIG. 2I, work computer 215 will resolve the conflict by syncing down 270 the C property value from mobile phone 210 to work computer 215. As such, work computer 215 will change the property value from B to C, thereby resulting sync up arrow 250 indicating that the C property value needs to sync up to PDA 205. Although the resulting sync down arrow 225 and sync up arrow 250 appear to result in a conflict, no true conflict exists since the property values to be synced are the same. Accordingly, as shown in FIG. 2J, upon the next synchronization between work computer 215 and PDA 205 the sync arrows will be resolved and each node within the distributed computing system 200 will have the property value of C, thereby increasing the likelihood of providing consistent resolution of similar data conflicts at other devices in the distributed computing system 200 and reducing the continuation of a synchronization loop.

It should be noted that although the above example for breaking potentially infinite sync loops had the two high fidelity nodes 215, 220 utilize the conflict resolution algorithm 275 and data selection criteria 280 to resolve conflicts, one would recognize that any number of devices in any number of configurations may be used to dampen the effects of a potentially infinite sync loop. Accordingly, the above use of particular nodes to increase the likelihood of providing consistent resolution of data conflicts between devices in a distributed computing system is used for illustrative purposes only and is not meant to limit or otherwise narrow the scope of the present invention.

The present invention may also be described in terms of methods comprising functional steps and/or non-functional acts. The following is a description of steps and acts that may be performed in practicing the present invention. Usually, functional steps describe the invention in terms of results that are accomplished, whereas non- functional acts describe more specific actions for achieving a particular result. Although the functional steps and non-functional acts may be described or claimed in a particular order, the present invention is not necessarily limited to any particular order or combination of acts and/or steps. Further, the use of acts and/or steps in the recitations of the claims and in the following description of the flow chart for FIG. 3 are used to indicate the desired specific use of such terms.

Figure 3:
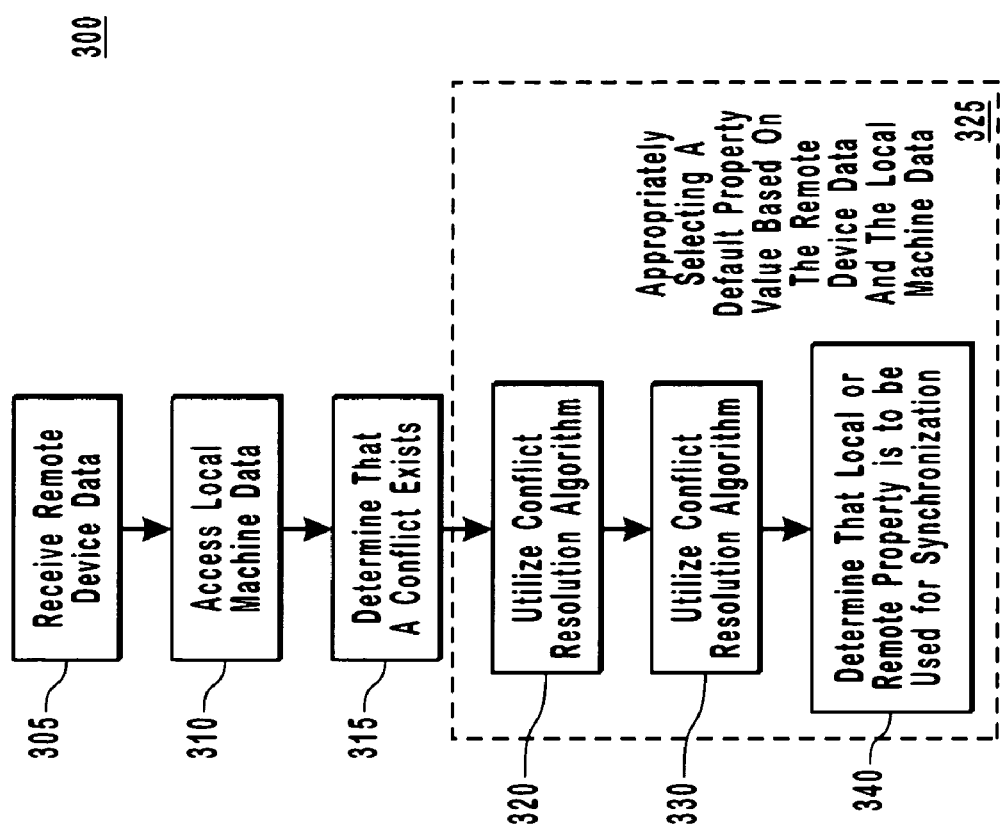
FIG. 3 illustrates an example flow chart for a method of providing consistent resolution of data conflicts in accordance with example embodiments of the present invention.

FIG. 3 illustrates an example flow chart of a method 300 for providing consistent resolution of data conflicts when synchronizing data between two or more devices in order to reduce the likelihood of a potentially infinite synchronization loop within a distributed system. The following description of FIG. 3 will occasionally refer to corresponding elements from FIGS. 1B, and 2G-J. Although reference may be made to a specific element from these figures, such elements are used for illustrative purposes only and are not meant to limit or otherwise narrow the scope of the present invention.

Method 300 includes an act of receiving 305 remote device data. For example, local machine 132 may receive remote device data from remote device 116, wherein the remote device data includes a remote property needing to be synchronized with a local property. The remote device data may be low fidelity data in that it came from a remote device 135 incapable of maintain time date information. Furthermore, the remote property and local properties may correspond to a contact and may be one or more of an address, name, phone number, email address, webpage, etc.

Method 300 also includes an act of accessing 310 local machine data. For example, local machine 132 may access local machine data that includes a local property needing to be synchronized with the remote property. Method 300 may also include an act of determining 315 that a conflict exists. For example, local machine 132 may determine that a conflict exists between the remote property and the local property.

Method 300 may also include a functional result-oriented step for appropriately selecting 325 a default property value based on the remote device data and the local machine data. The step 325 can include any corresponding acts for accomplishing the result of selecting a default property value based on the remote device data and the local machine data. In the example flow chart of FIG. 3, however, step 325 includes a corresponding act of utilizing 320 a conflict resolution algorithm. For example, local machine 132 may use conflict resolution algorithm 145 to generate unique remote value 150 from property value B. The step 325 also includes a corresponding act of utilizing 330 the same conflict resolution algorithm. For example, local machine 132 may use conflict resolution algorithm 145 to generate unique local value 155 from property value C. Example embodiments provide that the conflict resolution algorithm 145 may be transitive.

Step 325 also includes a corresponding act of determining 340 that local or remote property is to be used for synchronization. For example, data selection criteria 160 may choose either the resulting remote value 150 or local value 155 and based on data selection criteria 160, which increases the likelihood of providing consistent resolution of similar data conflicts between other devices in the distributed computing system.

Example embodiments provide that the determined property to be used for synchronization is a default value 165, and a user may be presented with a UI that highlights the default value. Other example embodiments provide that where multiple conflicts exist and multiple default values are generated, conflict resolution algorithm 145 may be utilized along with selection criteria 160 to present the user with an option within the UI to apply all the multiple default values. In yet other example embodiments, the determined property value to be used for synchronization is automatically chosen with no user input.

Still other example embodiments provide that the conflict resolution algorithm 145 is a hash function and the data selection criteria 160 is a choice of the greatest or least value between the remote value 150 and the local value 155. Alternatively, the conflict resolution algorithm 145 chooses a portion of the remote property and a corresponding portion of local property. The remote and local values 150, 155 are based on the addition of the number of positive or negative bits. Finally, the data selection criteria 160 may be a choice of the greatest or least value between the remote value 150 and the local value 155.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer- readable media. Computer-executable instructions comprise, for example, instructions and data which cause a general purpose computer, special purpose computer, or special purpose processing device to perform a certain function or group of functions.

Figure 4:
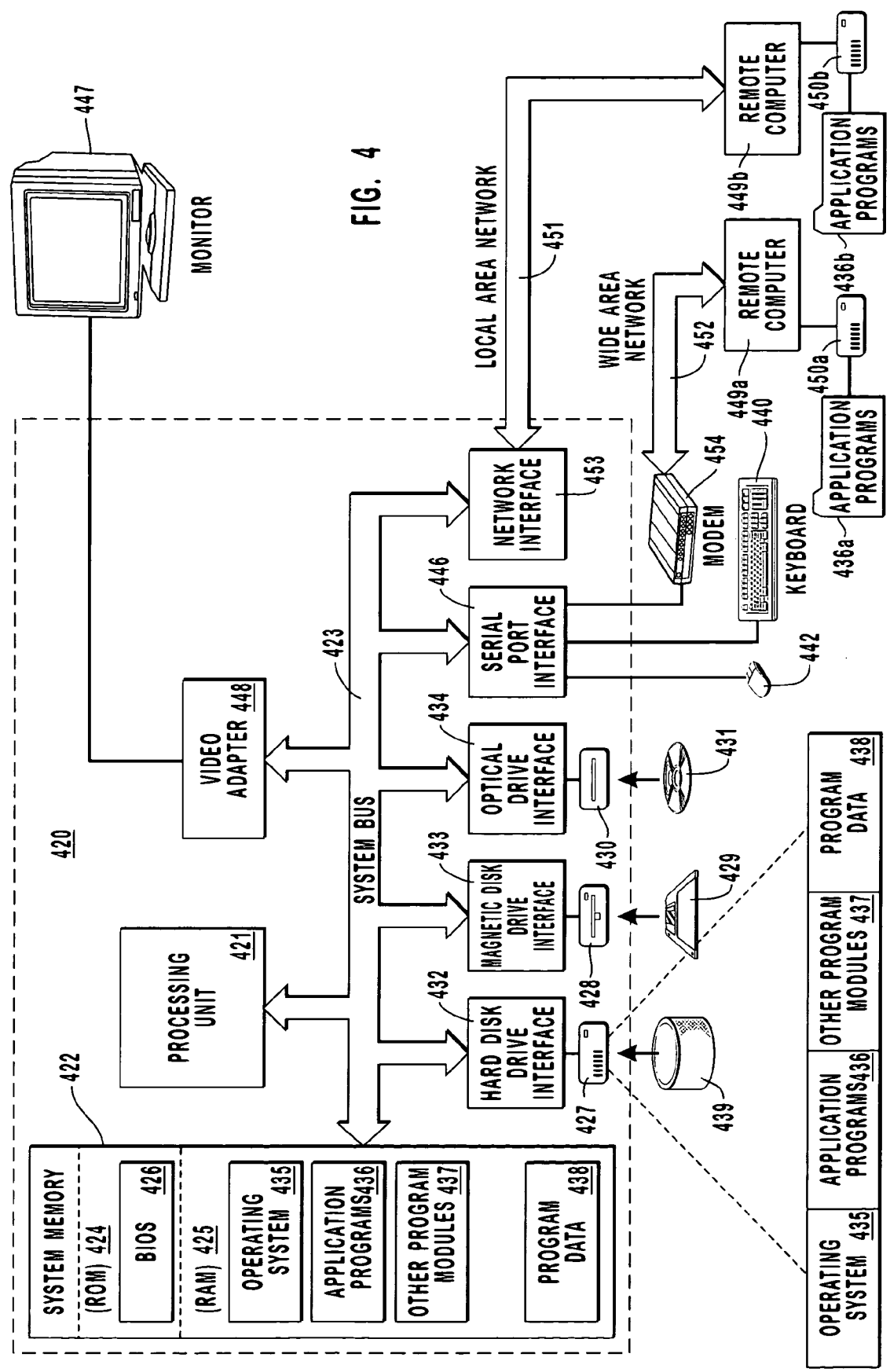
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a distributed computing system capable of synchronizing properties, a method of providing consistent resolution for synchronization conflicts in order to reduce infinite synchronization loops within the distributed system, the method comprising acts of:
   at a local machine connectable to a plurality of remote devices:
      receiving remote device data that includes a remote property needing to be synchronized with a local property, the remote device data having been input at a first remote device, wherein the first remote device is a low fidelity device that is unable to maintain time date information and the remote device data being low fidelity data;
      accessing local machine data that includes the local property needing to be synchronized with the remote property;

after receiving the remote device data and accessing the local machine data, determining that a conflict exists between the remote property and the local property;

after determining that the conflict exists at the local machine, and in response to determining that the conflict exists:
- utilizing a conflict resolution algorithm to generate a remote value from the remote property;
- utilizing the conflict resolution algorithm to generate a local value from the local property;
- applying data selection criteria to a comparison of the remote value to the local value, and in a manner that reduces infinite synchronization loops among the local machine and two or more remote devices having corresponding properties for synchronization, wherein applying data selection criteria comprises:
  - at a binary bit level, summing bits of the remote value generated from the remote property to generate a first sum;
  - at a binary bit level, summing bits of the local value generated from the local property to generate a second sum; and
  - determining which of the first and second sums has a greater value or a lesser value; and
- based at least on which of the first sum and second sum has a greater value or a lesser value, selecting the first sum or the second sum, and applying either the remote property or the local property associated with the selected of the first sum or the second sum for synchronization with the local machine or remote device, respectively.

2. The method of claim 1, wherein the conflict resolution algorithm is transitive.

3. The method of claim 1, wherein the determined property to be used for synchronization is a default value, and a user interface is presented to a user that highlights the default value.

4. The method of claim 3, wherein multiple conflicts exists and multiple default values are generated utilizing the conflict resolution algorithm, and the user of the local machine is presented with an option within the user interface to apply all the multiple default values.

5. The method of claim 1, wherein the determined property to be used for synchronization is automatically chosen with no user input.

6. The method of claim 1, wherein the conflict resolution algorithm is a hash function and the data selection criteria bases selection between the remote value and the local value on which is the greatest or least value.

7. The method of claim 1, wherein the conflict resolution algorithm chooses at least a portion of the remote property and a corresponding portion of the local property, and the remote and local values are based on the addition of a number of positive or negative bits, and the data selection criteria is a choice of the greatest or least value between the remote value and the local value.

8. The method of claim 1, wherein the properties correspond to a contact and are one or more of an address, phone number, email address, or web page.

9. In a distributed computing system capable of synchronizing properties, a method of providing consistent resolution of synchronization and avoiding infinite synchronization loops within the distributed system, the method comprising:

at a local machine that is connectable to a plurality of remote devices and is in communication with at least one of the plurality of remote devices:
- an act of receiving remote device data from the at least one of the plurality of remote devices, the remote data being low fidelity data in that the at least one of the plurality of remote devices is unable to maintain time date information, and the remote data including a remote property needing to be synchronized with a local property;
- an act of accessing local machine data that includes the local property needing to be synchronized with the remote property;
- an act of determining that a conflict exists between the remote property and the local property, wherein the remote device is a low-fidelity that does not keep time/date information for the remote property, the local machine does not maintain data for the remote and local property for syncing, or both, and wherein determining that a conflict exists after receiving the remote data and after accessing the local machine data; and
- after determining that the conflict exists, and in response thereto, a step for appropriately selecting a default property value based on applying data selection criteria to a remote value generated from the remote property and a local value generated from the local property, wherein the remote value and local value are generated using a conflict resolution algorithm and applying at least a portion of the remote property and local property respectively thereto, wherein the data selection criteria of which portions of the remote and local properties to use comprises an evaluation of a binary bit representation for the remote value compared with the local value, and wherein application of the selection criteria for selecting the default property substantially avoids infinite synchronization loops among three or more devices having corresponding properties for synchronization, wherein evaluation of a binary bit representation for the remote value compared with the local value comprises:
  - at a binary bit level, summing bits of the remote value generated from the remote property to generate a first sum;
  - at a binary bit level, summing bits of the local value generated from the local property to generate a second sum;
  - determining which of the first sum and the second sum has a greater value or a lesser value; and
  - selecting either the remote property or the local property for synchronization with the local machine or remote device by selecting the first sum or the second sum, based on which has the greater or lesser value, and applying the property associated with the selected of the first sum or the second sum to both the local device and the remote device.

10. The method of claim 9, wherein the conflict resolution algorithm is transitive.

11. The method of claim 10, wherein multiple conflicts exists and multiple default values are generated utilizing the conflict resolution algorithm, and the user is presented with an option within the user interface to apply all the multiple default values.

12. The method of claim 10, wherein the conflict resolution algorithm is a hash function applied after previously determining that a conflict exists between the local property on the local machine and the remote property received from the at least one of the plurality of remote devices, and wherein the data selection criteria bases selection of the local or remote property on a greatest or least value between the remote value and the local value.

13. The method of claim 10, wherein the conflict resolution algorithm chooses at least a portion of the remote property and a corresponding portion of the local property, and the remote and local values are based on adding together a plurality of positive or negative bits, and the data selection criteria bases selection on the greatest or least value between the remote value and the local value.

14. The method of claim 9, wherein the selected default property valued is highlighted at a user interface and presented to a user.

15. The method of claim 9, wherein the selected default property value is automatically chosen with no user input.

16. The method of claim 9, wherein the properties correspond to contact information and are one or more of an address, phone number, email address, web page.

17. The method of claim 9, wherein:
the step for appropriate selecting a default property value based on applying selection criteria to a remote value and a local value, includes:
applying a selection rule prioritizing a high-fidelity device over the low-fidelity device.

18. In a distributed computing system capable of synchronizing properties, a computer program product for implementing a method of providing consistent resolution synchronization conflicts in order to reduce infinite synchronization loops within the distributed system, the computer program product comprising:
one or more computer readable non-transmission type storage media having stored thereon computer executable instructions that, when executed by a processor, can cause the distributed computing system to perform the following:
at a local machine connectable to a plurality of remote devices, and currently connected to at least one of the plurality of remote devices;
receive remote device data that includes a remote property needing to be synchronized with a local property, the remote device data being received from one of the plurality of remote devices currently connected to the local machine, wherein the one of the plurality of remote devices is a low fidelity device that is unable to maintain time date information and the remote device data being low fidelity data;
access local machine data that includes the local property needing to be synchronized with the remote property received from the one of the plurality of remote devices currently connected to the local machine;
determine that a conflict exists between the remote property received from a remote device and the local property of the local machine;
after the determination is made that the conflict exists, and in response to determining that the conflict exists:
utilize a conflict resolution algorithm to generate a unique value from the remote property;
utilize the conflict resolution algorithm to generate a local value from the local property; and
apply data selection criteria to a comparison of the remote value to the local value, and in a manner that eliminates infinite synchronization loops among three or more devices having corresponding properties for synchronization, wherein applying data selection criteria includes:
at a binary bit level, summing bits of the remote value generated from the remote property to generate a first sum;
at a binary bit level, summing bits of the local value generated from the local property to generate a second sum; and
determining which of the first and second sums has a greater value or a lesser value; and
based at least on which of the first sum and second sum has a greater value or a lesser value, selecting the first sum or the second sum, and applying either the remote property or the local property associated with the selected of the first sum or the second sum for synchronization with the local machine or remote device, respectively.

19. The computer program product of claim 18, wherein the conflict resolution algorithm is transitive in that unique values can be generated for a large number of properties.

20. The computer program product of claim 18, wherein the determined property to be used for synchronization is a default value, and a user interface is presented to a user that highlights the default value.

21. The computer program product of claim 20, wherein multiple conflicts exists and multiple default values are generated utilizing the conflict resolution algorithm, and the user is presented with an option within the user interface to apply all the multiple default values.

22. The computer program product of claim 18, wherein the determined property to be used for synchronization is automatically chosen with no user input.

23. The computer program product of claim 18, wherein the conflict resolution algorithm is a hash function and the data selection criteria is a choice of the greatest or least value between the remote value and the local value.

24. The computer program product of claim 18, wherein the conflict resolution algorithm chooses at least a portion of the remote property and a corresponding portion of the local property, and the remote and local values are based on the addition of a number of positive or negative bits, and the data selection criteria is a choice of the greatest or least value between the remote value and the local value.

25. The computer program product of claim 18, wherein the properties correspond to a contact and are one or more of an address, phone number, email address, web page.

* * * * *